Feb. 24, 1970 C. F. BUHRER 3,497,239

LABEL READER WITH TRACKING OF LABEL USING CONCENTRIC BINARY CODE RINGS AND RADIALLY MODULATED CIRCULAR SCAN

Filed March 29, 1967 2 Sheets-Sheet 1

INVENTOR.
CARL F. BUHRER

BY R. J. Frank
ATTORNEY.

INVENTOR.
CARL F. BUHRER
BY R. J. Frank
ATTORNEY.

United States Patent Office 3,497,239
Patented Feb. 24, 1970

3,497,239

LABEL READER WITH TRACKING OF LABEL USING CONCENTRIC BINARY CODE RINGS AND RADIALLY MODULATED CIRCULAR SCAN

Carl F. Buhrer, Oyster Bay, N.Y., assignor to General Telephone & Electronics Laboratories Incorporated, a corporation of Delaware Filed Mar. 29, 1967, Ser. No. 626,891
Int. Cl. G01n 21/30
U.S. Cl. 250—219 10 Claims

ABSTRACT OF THE DISCLOSURE

A system for identifying articles having a coded label thereon. The label contains two annular rings which are subdivided into a number of equal subsections. A pair of subsections represents one digit of the code. The label is circularly scanned by a radially modulated beam of light and a photosensitive detector is positioned to receive light from the label. The output of the detector is supplied both to a tracking system which centers the circular scan on the annular rings and to a readout system.

BACKGROUND OF THE INVENTION

This invention relates to an article identification system of the type wherein a coded label affixed to an article is scanned to provide both a tracking signal for the scanning means and the readout of the coded information thereon.

Various systems for automatically scanning a coded label affixed to an article and thereby uniquely identify the article have been proposed. The information contained on the label is normally expressed in binary form wherein each digit constitutes either a 1 or 0. Generally, all 1's or all 0's are denoted by marking the corresponding portion of the label with a light-emissive material. The label is scanned with a light beam and a photosensitive detector is utilized to receive the light from the label.

The information is generally encoded in a circular manner on the label to provide an orientation-insensitive label. The distribution of the information about the circumference of a circular section of the label significantly reduces the resolution required for the system as compared with a bullseye or radial distribution of an equal number of binary digits. However, it has heretofore been necessary to incorporate timing information on the label along with the information identifying the article. The timing digits are used to indicate the starting point for the label scanner. As a result, the identifying binary digit capacity of a particular size label was significantly reduced.

The timing information contained in these labels may take many forms such as a predetermined number of consecutive 1's or 0's. This information enabled the subsequent processing circuits to determine the most or least significant digit of the detected signal. The tracking information, generally comprises a bullseye pattern located at the center of the label. This tracking information is utilized to provide a centering of the scanning signal on the label.

Many systems for utilizing this tracking information have been described. One system requires an imaging of the label on a vidicon tube and the generation of appropriate scan signals for the vidicon tube. Another system utilized a separate prescan target on the label to determine the path of the label. The signals derived from the prescan target activate a plurality of servo motors which are coupled to corresponding rotating mirrors. These mirrors are mechanically rotated to follow the path of the label and insure that the label image is always focused in a particular image plane within the detection apparatus.

SUMMARY OF THE INVENTION

The present article identification system comprises a label of particular construction and coding, a scanning light source which generates a moving spot of light and means for driving the scanning source so that the spot of light circularly scans the label in a radially modulated scan pattern. In addition, a photosensitive detector is positioned to receive light from the label and a tracking system responsive to the output of the decoder is provided to enable the scanning source to center the scan pattern on the label. A readout system responsive to the output of the detector establishes the identity of each label from the detected signal.

The information is encoded on the label in binary form and is disposed in a circular configuration. The label comprises a central section and first and second adjacent annular sections. By equal arcuate subsections, it is meant that the central angles subtended by the subsections are equal. Each pair of radially-adjacent subsections constitutes one binary digit with each subsection of a pair containing the complement of the binary information contained in the other subsection. Thus, a subsection pair contains both a "1" and "0." Whether a given pair is encoded with a "1" or "0" is determined by which subsection contains the "1."

The label contains $n$ digits of information encoded thereon and arranged in a circle. All of the subsections are utilized for the coding of information and, therefore, the label contains no indication of a starting point. The set of binary numbers having $n$ digits ranges in value from 0 to $2^{n-1}$. This set can be divided into subsets containing $n$ or fewer members which are related to each other by only a rotation of their circular counterparts. Stated in other terms, a subset contains at most $n$ members since that is the number of subsection pairs on the label. The members of each subset can be found by taking one member and placing the most significant digit thereof in the least significant position. By performing this task $n-1$ times, all of the members of a particular subset are defined. Since this process may provide identical numbers within a subset, a subset may contain less than $n$ different members. Each subset can be characterized by one of its members. As discussed later in the specification, the number of subsets approaches $2^n/n$ as $n$ becomes large and this is the information carrying capacity of the label.

In the present system, the label is affixed to the article which it identifies. The information is encoded on the label by coating sections thereof with a light-emissive material such as a fluorescent ink which is excited by ultraviolet and emits in the visible or infrared region or by a reflective ink. In addition, the central portion of the label is coated with a light-emissive material to facilitate tracking. The scanner illuminates the label with a fast moving spot. The scan pattern focused on the label is circular with a radius equal to the radius of the locus of points midway between the first and second annular sections of the label. In addition, the scanning spot is radially modulated to sweep across both sections.

A photosensitive detector is oriented to collect light emitted by (or reflected from) the label. Due to the scan pattern of the spot, the output of the detector contains components at both the frequency $f_r$ of the radial modulation and at the frequency $f_\theta$ of the circular scan. The components at the freqeuncy $f_r$ contain the digital information. Since the spot scans both subsections in each pair, light is detected during only one-half of the $f_r$ signal. This is due to the fact that only one subsection in each pair is light-emissive. The polarity of the detected half-cycle indicates whether a particular pair contains either a "1" or "0."

At the same time, the detector output components of $f_\theta$ indicate whether the scan is centered on the label. As mentioned, the scan is centered when the radius of its scanning pattern is equal to the radius of the circle formed between the two annular sections. Since the subsections are equal and the number of "1's" is equal to the number of "0's", the scan is centered when the average time of the detected output is constant around the label. If the scan is off center, the pattern overlies a portion of the central section and the duration of the detected output signals varies as the spot scans in its circular manner. This produces a detector output component at $f_\theta$ which has an amplitude proportional to the displacement of the scan and a phase dependent upon the direction of displacement. Thus, the synchronous phase detection of this component relative to the $f_\theta$ signal producing the scan pattern provides error tracking voltages which correct the position of the pattern formed by the scanning spot.

The present system utilizes the article identifying information encoded on the label to generate the tracking information. In addition, the particular label does not require the incorporation of additional timing information thereon since the label may be read at any starting point. Further features and advantages of the invention will become more readily apparent from the following detailed description of a specific embodiment when taken in conjunction with the accompanying drawings.

DESCRIPTION OF THE PREFERRED EMBODIMENT

Figure 1:
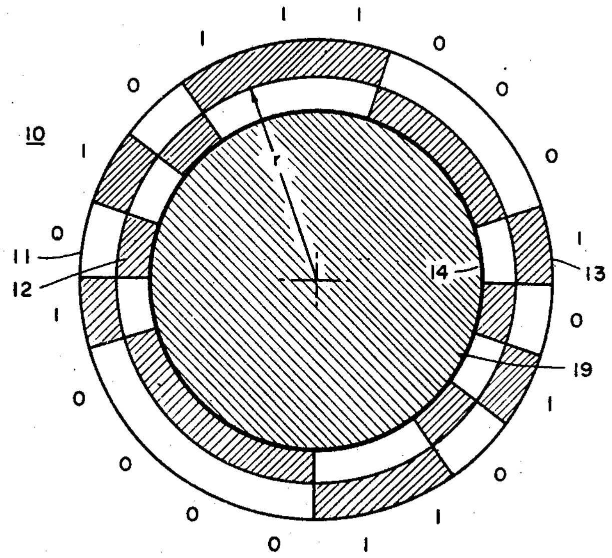
FIGURE 1 shows the coding pattern for a label containing 20 digits.

Referring now to FIG. 1, the label 10 is shown containing first and second adjacent annular sections 11 and 12 respectively. The radius $r$ is the distance from the center of the label to the circle formed by the locus of points midway between the annular sections. As used herein, the term label denotes a configuration of information which may be printed on the article to be identified and need not be a physically attachable label.

The annular sections are each divided into $n$ equal arcuate subsections. Adjacent subsections, such as 13 and 14, are referred to herein as a subsection pair and constitute one binary digit. The number of digits $n$ in the label of FIG. 1 is shown as 20. A "1" in a particular digit corresponds to a shaded subsection in the first annular section. These binary coded digits are shown adjacent the corresponding subsection pairs. The shaded subsections and the shaded central section 19 indicate the light-emissive portions of the label. In determining the manner of coding for the present label, the total number of binary numbers that can be contained on the label ranges from 0 to $2^{n-1}$. Since the digits are arranged in a circular pattern and no space is allotted to a starting or timing mark, the number of binary numbers that can be used to identify the article is less than $2^n$ because the readout process can start in any one of $n$ places. For large values of n, such as $n=20$, approximately $2^n/n$ distinguishable patterns are possible.

The set of binary numbers ranging in value from 0 to $2^{n-1}$ can be divided into subsets of numbers in which all of the members are related to each other by the location of the most significant digit. This grouping of numbers into subsets is due to the circular manner in which the digits are displayed on the label and the lack of any timing digits. Assuming a given number of $n$ digits is written in a circle, the remaining members of its subset can be found by just changing the location at which one starts to read. In other words, the binary number is permuted $n-1$ times by shifting the most significant digit to the least significant position.

Each subset of numbers can be specified by any one of its members. It should be noted that a subset of $n$ digits may not contain $n$ different numbers since the same number may occur more than once during the permutation thereof. In the embodiment described herein, a single unique notation was established by specifying a subset by its member of least value.

While the specifying of a subset by its member of least value establishes a single notation for identifying the article, most of the binary numbers from 0 to $2^{n-1}$ are not used. As mentioned above, only about $2^n/n$ are used. In cases where the memory employed in the readout device contains sequential locations 0 to $2^{n-1}$, many storage locations are not used. The size of the memory can be reduced if desired by performing additional operations with these least value members. Presently available computers contain circulating storage elements which can be utilized to identify the member of least value belonging to the subset of the particular number read from the label. These minimum value numbers may be generated during the initialization of the program and sequentially stored in the memory of the computer. The sequence number of these memory locations identifies another memory location in which the information corresponding to the article is sequentially stored. The number supplied to the computer is permuted to its minimum value and compared with the stored minimum values to indicate the memory location containing the appropriate information. It will be recognized that many other programs for the utilization of the number read from the label may be employed.

Figure 2:
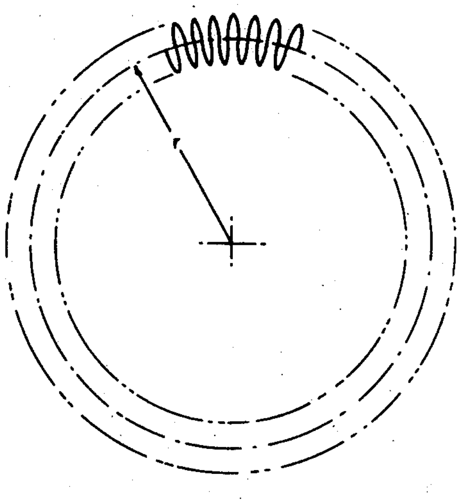
FIGURE 2 shows the radially modulated circular scan pattern of the present invention.

The label is scanned by a spot of light. The scan pattern of the spot is shown in FIG. 2. The spot moves circularly at a frequency $f_\theta$ and a radius $r$ equal to the radius $r$ of the locus of points midway between the first and second annular sections of the label. The circular path is radially modulated at a frequency $f_r$ so that the spot sweeps across both annular sections. In addition, the scan pattern is caused to move across a field of view to permit the label to be scanned as it moves. The frequency $f_r$ is substantially greater than the frequency $f_\theta$ to insure that each subsection pair is scanned in a radial manner several times before the scanning spot moves to the next subsection pair. In the embodiment desribed herein, the frequencies $f_\theta$ and $f_r$ were 5 kHz. and 1.5 mHz. respectively.

Figure 3:
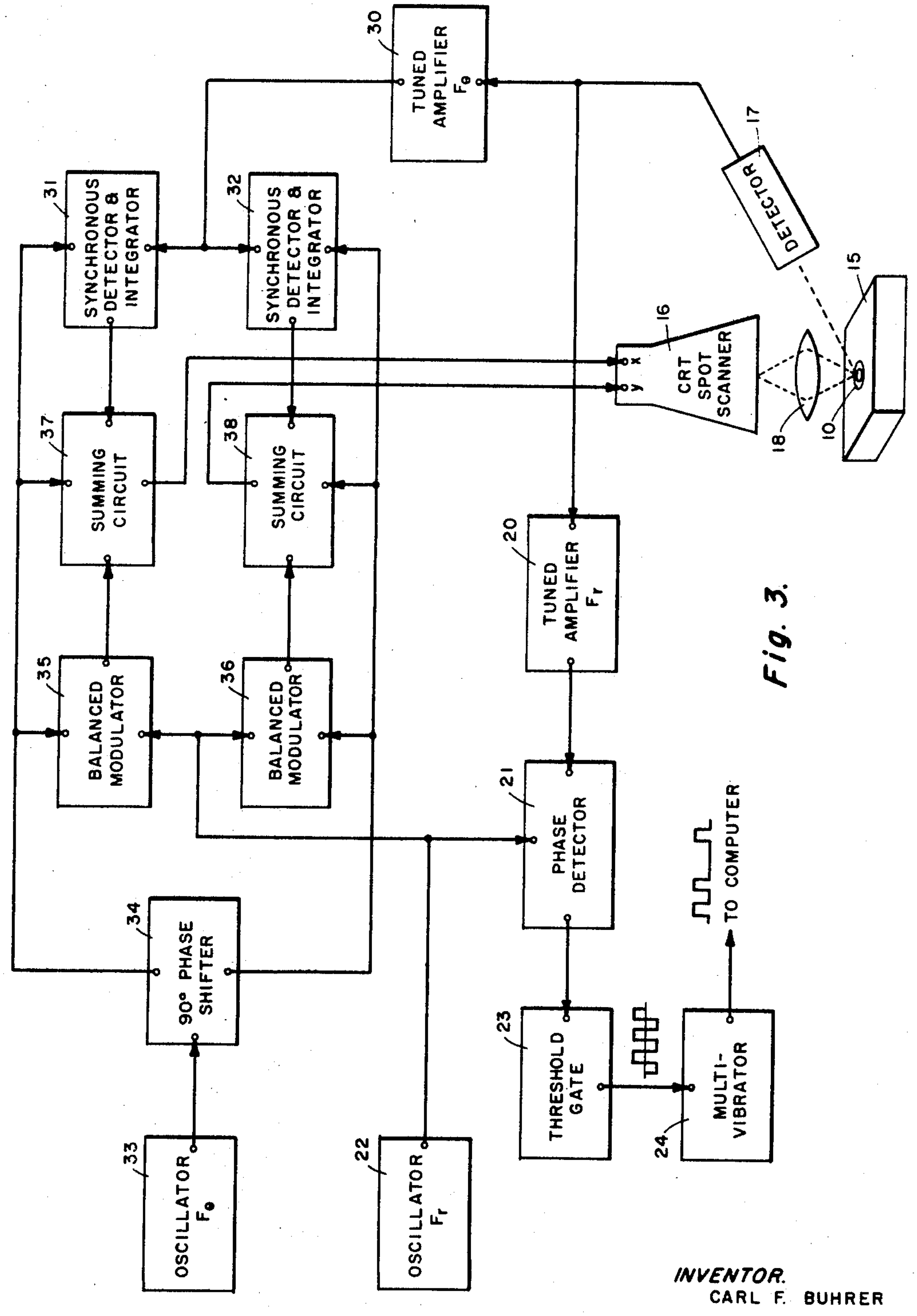
FIGURE 3 is a block schematic diagram of one embodiment of the invention.

The article identification system is shown in block schematic form in FIG. 3 wherein the label 10 is affixed to article 15. A cathode ray tube 16 is used as a flying spot scanner to illuminate the label with a fast moving spot of light. Preferably, the spot of light is ultraviolet and a suitable ultraviolet-responsive fluorescent material is used in the encoding of the label to minimize the effects of ambient lighting. In addition, a lens 18 is shown interposed between the cathode ray tube and the label to focus the spot in the plane of the label.

Readout is accomplished by means of a photosensitive detector 17 sensitive to the light emitted by (or reflected from) the label and oriented so as to collect such light regardless of where the label is located within the field of view. Photocurrent frequency components near $f_r$ contain the digital information. By superimposing the scan pattern of FIG. 2 on the label of FIG. 1, it is seen that light is received during one half cycle of $f_r$ when the scan pattern is centered on the label. The polarity of that half cycle depends upon whether the binary digit being scanned is a "1" or a "0."

The detector output is supplied to tuned amplifier 20 which filters out and amplifies the $f_r$ component. The output terminal of the tuned amplifier is coupled to phase detector 21. In addition, the output of oscillator 22 having a frequency $f_r$ is supplied to detector 21. The detector demodulates the signal by comparing the phase of the signal at frequency $f_r$ from oscillator 22 with the phase of the detected signal and provides a differing polarity output signal for "1" or "0" digits. The bipolar output signal of detector 21 is supplied to threshold gate 23 which effects a parity check by deciding whether the signal is sufficiently positive or negative to indicate a "1" or "0" or whether the signal is substantially zero and should therefore be rejected. In the absence of a zero signal, the bipolar output signal of detector 21 is passed by the gate.

The output from the threshold gate is then supplied to a computer having the appropriate information stored in its memory. If desired, the bipolar output signal can be converted to a unipolar series of pulses by coupling a monostable multivibrator 24 to the output of the threshold gate 23. In the present embodiment, the 20 digit label is read in 10 msec. which corresponds to a digit rate of one per 50 $\mu$sec. The multivibrator 24 was triggered on by the positive polarity digits and remained on for 15 $\mu$sec. At this time, the multivibrator returned to its quiescent state at least until the occurrence of the the next digit, i.e. 35 $\mu$sec. later, at which time the multivibrator is retriggered if the digit is positive. The signal supplied to the computer uniquely identifies the label. This signal corresponds to a memory location in the computer containing the required pricing or inventory information. As mentioned previously, a number of additional operations can be performed on the coded number to decrease the size of the memory required.

The cathode ray tube 16 is driven in the radially-modulated circular manner shown in FIG. 2 by the application of first and second scanning signals thereto having the form $\cos 2\pi f_\theta t(1+m \cos 2\pi f_r t)$ for one axis of the tube and the form $\sin 2\pi f_\theta{}^t(1+m \cos 2\pi f_r t)$ for the other axis. The first terms of the scanning signals, namely, $\cos 2\pi f_\theta t$ and $\sin 2\pi f_\theta t$ are obtained by coupling the first and second output terminals of 90 degree phase shifter 34 directly to an input terminal of the corresponding summing circuit 37 and 38. The input signal to phase shifter 34 is provided by oscillator 33.

The second terms of the scanning signals $m \cos 2\pi f_\theta t \cos 2\pi f_r t$ and $m \sin 2\pi f_\theta t \cos 2\pi f_r t$ are produced in the balanced modulator 35 and 36 respectively. The symbol $m$ represents the modulation index. The input terminals of the balanced modulators are each coupled to one terminal of phase shifter 34 and to the output terminal of oscillator 22. The output signals from modulators 35 and 36 are supplied to summing circuits 37 and 38 respectively.

The output terminal of each summing circuit is coupled to one of the input terminals of scanner 16, labelled $x$ and $y$ in FIG. 3 to denote the different axes of the spot scanner. The output signals of the summing circuits, when applied to conventional cathode ray tube spot scanner, produce a scan pattern as shown in FIG. 2.

When the scan pattern is exactly centered upon the label, the average amount of time that the label is producing a light signal is constant around the label. The label is producing a signal at each subsection pair for an interval equal to one-half the time required for the scan signal to traverse the pair. The label is divided into two annular sections which are subdivided into equal arcuate subsections so that this interval is essentially constant around the label and independent of the number encoded thereon. However, if the scan pattern is not centered on the label, the average time that the label is generating a light signal varies in accordance with the amount of misalignment. In this misaligned condition, the spot is scanning part of the central portions of the label. As a result, a component at the frequency $f_\theta$ appears at the output of detector 17 which has an amplitude proportional to the displacement of the scan relative to the label and at a phase relative to the signals at the $x$ and $y$ terminals of the scanner 16 which is dependent upon the direction of this displacement.

To generate tracking information, the output of detector 17 is supplied to tuned amplifier 30 which filters out and amplifies the $f_\theta$ components of the detected signal. The output of the amplifier 30 is supplied to first and second synchronous detectors 31 and 32. The synchronous detectors are each provided with a reference signal at frequency $f_\theta$. These reference signals are in phase quadrature and are derived from 90 degree phase shifter 34.

As long as the scanning pattern overlies a part of the label, a component at the frequency $f_\theta$ will be supplied to the synchronous detectors 31 and 32. This component can be considered as a vector quantity and, therefore, resolved into $x$ and $y$ components. Since a synchronous deterctor is phase sensitive and the detectors 31 and 32 are supplied with reference signals in phase quadrature, the two components of the tracking signal are provided. Detector 31 determines the magnitude of the $x$ component of detected signal and, preferably, integrates the signal. The time constant of the integrator is determined by the desired response time for the system. The output signal from detector 31 is supplied to summing circuit 37 and added to the scanning signal applied to the $x$ terminal of scanner 16. Similarly, detector 32 provides the $y$-axis correction which is supplied to summing circuit 38. In this manner, the present system centers the scanning pattern on the label and will maintain this alignment as the label moves through the field of view.

The manner in which the article containing the label is brought into the field of view of the scanner can be mechanical, such as a conveyor, or may rely on an individual placing the article in the field. In these cases, the label must be located so that the scan pattern overlies a portion of the label and the detector output signal contains a component of the frequency $f_\theta$. The field of view of the spot scanner can be increased by applying a periodic sweep to the $x$ and $y$ axis terminals of scanner 16 so that the scanner, in effect, hunts for the label. To facilitate acquisition and tracking of the label, the central portion of the label can be provided with a coating that emits light of a different wavelength. In this case, detector 17 contains two photodetector tubes which are individually responsive to the different emitted wavelengths.

In one embodiment tested and operated, the labels were circular, about ⅞-inch in diameter, and contained $n=20$ digits. The 1's were encoded in blue emitting fluorescence material and the central portion of the label was coated with yellow emitting fluorescence material. The scanner 16 was a type 5ZP16 cathode ray tube having a 5-inch flat faceplate containing an aluminized P16 phosphor. Two magnetic deflection yokes were employed, one for tracking 5000 Hz. $f_\theta$ signals and the other for the 1.5 mHz. $f_r$ component. The yokes were types AW414–5674 and AY91Z–P270 respectively made by the Constantine Engineering Laboratories Co.

The tuned amplifier 30 and the synchronous detectors 31 and 32 were included in a dual channel amplifier model JB–6 made by the Princeton Applied Research Laboratories. This unit also contained the $f_\theta$ oscillator 33. The photosensitive detector 17 used consisted of two type 6199 photomultipliers, one sensitive to blue light and the other sensitive to yellow light, connected in parallel. The balanced modulators 35 and 36 utilized type 6JH8 tubes and the amplifier 20 included three 6BA6 tube stages with RF transformers having a primary and secondary Q of 10. The bandwidth of the tuned amplifier 20 was 135 kHz. at a center frequency $f_r$ 1.5 mHz.

While the above description has referred to a specific embodiment of the invention, it is apparent that many variations and modifications may be made therein without departing from the spirit and scope of the invention.

What is claimed is:

1. An article identification system of the type wherein the article is provided with a light-emissive label having information binary encoded thereon in first and second adjacent annular sections, one of said sections containing the binary coded information and the other section containing the complement thereof, said label containing in addition a central light-emissive section, which comprises:

(a) a scanning source for generating a moving spot of light;

(b) means for driving said source to provide a radially modulated circular scan pattern for the moving spot;

(c) a photosensitive detector positioned to receive light from said label; and (d) tracking means operative in response to the output of said detector for centrally positioning the scan pattern. on said label.

2. The article identification system of claim 1 further comprising a label containing first and second adjacent annular sections and a central section, said annular sections being divided into equal arcuate subsection pairs, one subsection of each pair being light-emissive in accordance with the information encoded on the label, said central section being light-emissive.

3. The article identification system of claim 2 further comprising readout means coupled to the photosensitive detector for establishing the identity of each label from the output of said detector.

4. The article identification system of claim 3 in which said means for driving said source comprises (a) generating means having first and second output terminals, said means generating first and second signals at a circular scan frequency, said first and second signals having a 90 degree phase difference therebetween;

(b) first and second modulators coupled to the first and second output terminals of said generating means, each of said modulators having an output terminal;

(c) an oscillator for generating an output signal at the radial modulation frequency, said oscillator being coupled to said first and second modulators whereby said first and second signals are modulated to provide first and second scanning signals; and (d) means for coupling the output terminals of said modulators to the scanning source.

5. The article identification system of claim 4 in which said tracking means comprises (a) a tuned amplifier coupled to the photosensitive detector, said amplifier filtering out and amplifying components of the output of said detector at the circular scan frequency;

(b) first and second synchronous detectors coupled to the output of said tuned amplifier, said first and second detectors being coupled to the first and second output terminals respectively of said generating means;

(c) means for coupling the outputs of said first and second synchronous detectors to the scanning source whereby the scan pattern of the moving spot is centered on the label.

6. The article identification system of claim 5 further comprises (a) a tuned amplifier coupled to said photosensitive detector, said amplifier filtering out and amplifying components of the output of said detector at the radial modulation frequency; and (b) a phase detector coupled to the output of said tuned amplifier and to the output of the oscillator, said detector comparing the phase of the oscillator output signal with that of the amplifier output signal to provide a bipolar output signal indicative of the information encoded on the label.

7. The article identification system of claim 6 further comprising (a) a threshold gate coupled to the output of said phase detector for detecting the presence of a substantially zero signal level in the bipolar output signal of said detector, and (b) a monostable multivibrator coupled to the output of said detector, said multivibrator being triggered by a single polarity portion of the detector output section to provide a unipolar output signal.

8. The article identification system of claim 6 in which the central section of said label is light-emission at a wavelength different from that of said first and second annular sections and said photosensitive detector is responsive to both of said different wavelengths.

9. In an article identification system of the type wherein a light-emissive label having information encoded thereon is scanned by a moving spot of light, a label which comprises (a) a central section, said central section having a light-emissive coating thereon; and (b) first and second adjacent annular sections, said annular sections being divided into *n* equal arcuate pairs of subsections, one subsection in each pair having a light-emissive coating thereon.

10. In an article identification system of the type wherein a light-emissive label having information encoded thereon is scanned by a moving spot of light, a label in accordance with claim 9 in which the central section is provided with a coating which emits light at a wavelength different from that of the coating of said subsections.

References Cited

UNITED STATES PATENTS

| | | | |
|---|---|---|---|
| 3,229,100 | 1/1966 | Greanias | 250—217 |
| 3,337,718 | 8/1967 | Harper et al. | 250—217 |
| 3,414,731 | 12/1968 | Sperry | 250—203 |

RALPH G. NILSON, Primary Examiner

MARTIN ABRAMSON, Assistant Examiner

U.S. Cl. X.R.

250—217, 224